United States Patent Office 3,417,132
Patented Dec. 17, 1968

3,417,132
4,7-METHANOINDENE DERIVATIVES
Morris Dunkel, Paramus, N.J., assignor to Universal Oil Products Company, Des Plaines, Ill., a corporation of Delaware
No Drawing. Filed Dec. 28, 1965, Ser. No. 517,090
5 Claims. (Cl. 260—488)

This invention relates to a new class of compounds to the preparational process therefor and to perfumes containing such compounds as olfactory ingredients. More particularly, this invention relates to novel 4,7-methanoindene derivatives.

The novel 4,7-methanoindene derivatives of this invention have the following structural formulae:

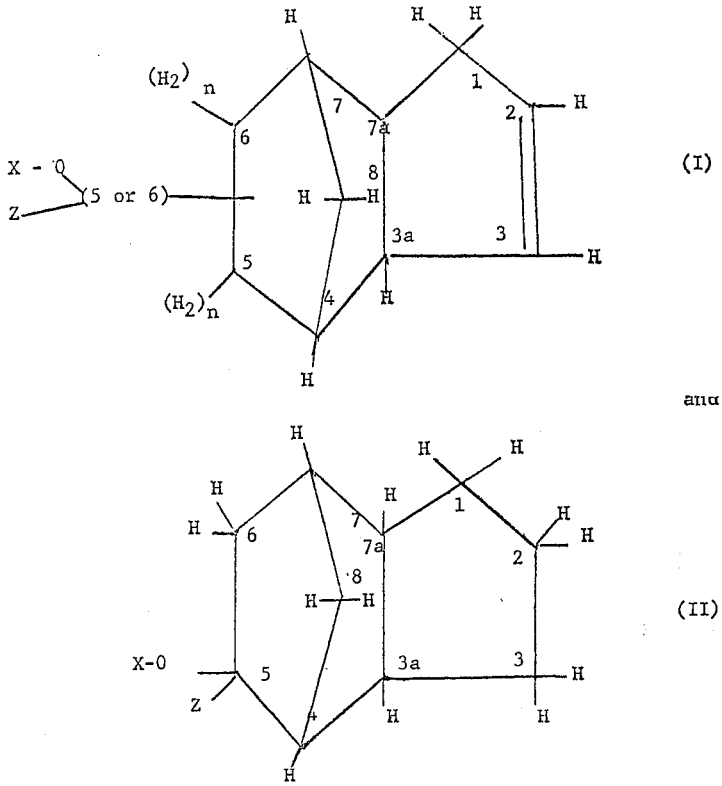

(I)

and (II)

wherein X is a member selected from the group consisting of hydrogen and an acyl group, O is oxygen, Z is an alkyl group and $n$ is an integer of 0 and 1; provided that for the carbon atom in the 5 or 6 position which is substituted with the X—O and Z substituents, the integer associated therewith is 0 and the other integer is 1. Because of the existence of the double bond in the hexahydromethanoindenes of this invention illustrated by FIGURE I above, the positions 5 and 6 are not chemically equivalent, and accordingly when the hexahydromethanoindenes are substituted with the X—O and Z substituents according to this invention, different isomeric compounds result depending upon whether the substituents are on the 5 or the 6 positioned carbon atom. The extremely close physical similarity of such isomers, moreover, prevents ready identification and separation of the different isomers from each other and for this reason it is intended that both isomeric forms of the hexahydromethanoindenes as well as mixtures thereof be encompassed within this invention by describing the hexahydromethanoindenes in this specification and appended claims as hexahydromethanoindenes substituted in one of the 5 and 6 positions with the X-O and Z substitutents. No comparable problem exists for the octahydromethanoindenes of this invention, illustrated by FIGURE II above, inasmuch as there is no double bond in the cyclopentane portion of the molecule and the positions 5 and 6 are, accordingly, chemically equivalent. For this reason, the octahydromethanoindenes are described in this specification and appended claims as being substituted with the X—O and Z substituents in the 5 position. It should be understood, however, that this nomenclature for the octahydromethanoindenes is for convenience only inasmuch as for these methanoindenes the positions 5 and 6 are chemically identical. Both the octahydro- and the hexahydromethanoindenes of this invention also exist in the exo and endo forms and the substituents X—O and Z also exist in the exo and endo forms. It is intended that all of these isomeric forms be encompassed within this invention.

The novel 4,7-methanoindenes of this invention disubstituted in one of the 5 or 6 positions with the aforementioned substituents, X—O and Z, find wide utility in the chemical field and are especially useful as plasticizers, ingredients of synthetic waxes and resins, perfume materials, or as intermediates for drugs or insecticides. Of these many uses, however, the most valuable use for these compound is in perfumery due to their highly pleasant odoriferous nature. Of considerable significance in this respect is that certain of these comopunds have odors which recall the odor of the highly valuable, naturally occurring cardamon seed oil.

Accordingly, it is an object of this invention to provide a new class of compounds consisting of 4,7-methanoindenes having two specific substituents at one of the five and six positions. Another object is to provide a preparational process for these 4,7-methanoindenes. Still another obect of this invention is to provide perfume compositions which contain these novel 4,7-methanoindenes as olfactory ingredients. Other objects of this invention will become apparent from the following further detailed description thereof.

The 4,7-methanoindene derivatives of this invention are prepared in general from the corresponding methanoindene ketones by reacting such ketones with an alkyl organometallic compound, such as an alkyl lithium compound or an alkyl metallic halide, to form a reaction product which, in turn, is reacted with an acyl halide or acid anhydride to obtain the desired alkyl and acyloxy substituted methanoindenes or with water to obtain the alkyl and hydroxy substituted methanoindenes.

The ketone starting materials may be readily obtained from the dimer of cyclopentadiene, 3a,4,7,7a-tetrahydro-4,7-methanoindene, through a hydroxy intermediate, by reacting such tetrahydromethanoindene with aqueous sulfuric acid to obtain 3a,4,5,6,7,7a-hexahydro-4-7-methanoindene substituted in one of the 5 and 6 positions with hydroxy. For purposes of convenience, the ketone precursor of the octahydromethanoindenes of this invention is prepared at this point by mildly hydrogenating the hydroxy substituted hexahydromethanoindene prepared as above to obtain 2,3,3a,4,5,6,7,7a-octahydro-4,7-methanoindene having the hydroxy substituent in the 5 position. The ketone of the octahydro- or the hexahydromethanoindene is then prepared from the corresponding hydroxy substituted methanoindene either by oxidation such as with potassium dichromate in the presence of sulfuric acid or by dehydrogenation with a suitable catalyst such as copper chromite to obtain either the 5-oxo-2,3,3a,4,5,6,7,7a-octahydro-4,7-methanoindene which is used to prepare the octahydromethanoindenes, represented by FIGURE II above, or the 3a,4,5,6,7,7a-hexahydro-4,7-methanoindene having the oxo substituent in one of the 5 and 6 positions which is used to prepare the hexahydromethanoindenes represented by FIGURE I above.

The 4,7-methanoindenes of this invention are prepared specifically by first reacting the corresponding ketone with an organometallic compound such as an alkyl metallic halide wherein the metallic portion thereof may comprise such metals as megnesium or zinc and the halide portion thereof may comprise chlorine, bromine or iodine. Preferably the alkyl metallic halide compound comprises a lower alkyl grignard such as alkyl magnesium halide where the alkyl portion preferably contains from 1 to about 8 carbon atoms, for example: ethyl magnesium chloride, propyl magnesium chloride, butyl magnesium chloride, amyl magnesium chloride, or hexyl magnesium chloride, or the bromides or iodides thereof. The alkyl grignards may be prepared according to conventional methods and an acceptable practice for the preparation of the compounds of this invention is to prepare the alkyl magnesium halide, in situ, just prior to the reaction thereof with the desired methanoindene ketone. This may be accomplished by slowly charging an alkyl halide to a reaction vessel containing a suitable solvent such as an ether, for example, diethyl ether or tetrahydrofuran and a measured quantity of magnesium metal turnings, preferably a 20 percent stoichiometric excess based upon the quantity of the ketone to be later reacted therewith. This grignard-forming reaction is conducted under atmospheric pressure at a temperature within from about 30° C. to 70° C. and preferably at the reflux temperature of the mixture and is continued after the addition is completed for from about 1 to 2 hours.

The desired methanoindene ketone, preferably dissolved in a suitable solvent, such as diethyl ether, tetrahydrofuran or dry toluene, is then added with stirring to the alkyl metallic halide, which is preferably an alkyl magnesium halide prepared as above, at a rate regulated to keep the exothermic reaction under control and to maintain the temperature of the reaction within the range of from about 20° C. to 60° C. To obtain desirable yields and to insure complete reaction of the ketone and the alkyl grignard, which react on an equimolar basis, it is preferable to use an excess of the alkyl grignard of up to 20 percent or more. This excess may be controlled as indicated above by regulating the quantity of magnesium used initially to prepare the alkyl grignard and by then completely reacting the magnesium with the alkyl halide. The reaction of the alkyl grignard and the methanoindene ketone proceeds rapidly and is generally complete shortly after all of the ketone has been added which usually requires only a few minutes. The resulting alkyl substituted reaction product is then decomposed with water to form the hydroxy and alkyl substituted methanoindenes or reacted, with either an acyl halide or an acid anhydride to form the acyloxy and alkyl substituted methanoindenes.

When it is desired to obtain alkyl substituted methanoindenes which are also substituted with hydroxy, that is where in FIGURES I or II above the X of the X—O radical is hydrogen and the Z radical is alkyl, the alkyl substituted reaction product prepared according to the above procedure is decomposed with water. Preferably the water used in the decomposition contains sufficient acidity to provide a clear aqueous phase in the reaction mixture after decomposition of the reaction product. To this end and to facilitate the decomposition, an acid or an acid-acting salt such as hydrochloric acid or ammonium chloride may be added to the water. The decomposition reaction with water may be effected by simply adding the water or preferably an aqueous solution containing the aforementioned acidic materials to the alkyl substituted reaction product in a quantity sufficient to form an aqueous layer at a temperature of about 25° C. The desired hydroxy and alkyl substituted methanoindene is then recovered from the decomposition reaction mixture by conventional methods such as extraction and distillation. Examples of the alkyl and hydroxy substituted methanoindenes of this invention include: 3a,4,5,6,7,7a-hexahydro-4,7-methanoindene substituted in one of the 5 and 6 positions with hydroxy and ethyl; 3a,4,5,6,7,7a-hexahydro-4,7-methanoindene substituted in one of the 5 and 6 positions with hydroxy and butyl; 3a,4,5,6,7,7a-hexahydro-4,7-methanoindene substituted in one of the 5 and 6 positions with hydroxy and isopropyl; 3a,4,5,6,7,7a-hexahydro-4,7-methanoindene substituted in one of the 5 and 6 positions with hydroxy and butyl; 3a, 4,5,6,7,7a-hexahydro-4,7-methanoindene substituted in one of the 5 and 6 positions with hydroxy and secbutyl; 3a,4,5,6,7,7a-hexahydro-4,7-methanoindene substituted in one of the 5 and 6 positions with hydroxy and isoamyl; or 3a,4,5,6,7,7a-hexahydro-4,7-methanoindene substituted in one of the 5 and 6 positions with hydroxy and octyl; and 5-hydroxy-5-ethyl-2,3,3a,4,5,6,7,7a-octahydro-4,7-methanoindene;
5-hydroxy-5-propyl-2,3,3a,4,5,6,7,7a-octahydro-4,7-methanoindene;
5-hydroxy-5-isopropyl-2,3,3a,4,5,6,7,7a-octahydro-4,7-methanoindene;
5-hydroxy-5-butyl-2,3,3a,4,5,6,7,7a-octahydro-4,7-methanoindene;
5-hydroxy-5-secbutyl-2,3,3a,4,5,6,7,7a-octahydro-4,7-methanoindene;
5-hydroxy-5-isoamyl-2,3,3a,4,5,6,7,7a-octahydro-4,7-methanoindene;
5-hydroxy-5-octyl-2,3,3a,4,5,6,7,7a-octahydro-4,7-methanoindene.

When it is desired to obtain alkyl substituted methanoindenes which are also substituted with an acyloxy substituent, that is wherein FIGURES I or II above the X of the X—O radical is an acyl group and the Z radical is alkyl, the alkyl substituted reaction product prepared accordingly to the above precedure is directly reacted with either an acyl halide or an acid anhydride without prior hydrolysis. The acyl halides or acid anhydrides which are used for this purpose have from 1 to about 7 carbon atoms in the acyl portion or portions of their molecules and include acetyl, propionyl, butyryl or isocaproyl halides or lower alkyl substituted forms thereof such as alpha- or beta- ethyl propionoyl or isobutyryl halides or the corresponding acid anhydrides thereof. The halide portion of the acyl halides may be chloride or bromide with the chlorides being the preferred reactants. The reaction of the alkyl substituted reaction product and the acyl halide or acid anhydride may be effected by slowly adding the desired acyl halide or acid anhydride, preferably dissolved in a suitable solvent such as diethyl ether, to the alkyl substituted reaction product with the temperature of the exothermic reaction being maintained at about 20° C. to 50° C. The resulting mixture is then stirred or allowed to stand for from about 1 to about 50 hours or more to insure complete reaction. A stoichiometric quantity of the acyl halide or the acid anhydride may be used although it is generally preferred to use an excess of up to about 20 percent or more based upon the amount of the alkyl substituted methanoindene reaction product present in the reaction mixture to insure desirable product yields. When the reaction is complete the desired product is recovered from the reaction mixture by conventional means such as extraction and distillation.

As an alternative, but less preferred procedure to the above method for preparing the alkyl and acyloxy substituted methanoindenes, an alkyl and hydroxy substituted methanoindene may be first prepared as hereinabove described and then esterified by reacting it with either an acyl halide or a acid anhydride of the classes hereinbefore illustrated to obtain the desired corresponding alkyl and acyloxy substituted methanoindene. Examples of the alkyl and acyloxy substiuted methanoindenes prepared according to the above procedures and illustrative of this class of compounds of this invention include 5-acetoxyl-5-ethyl-2,3,3a,4,5,6,7,7a-octahydro-4,7-methanoindene,
5-acetoxy-5-isoamyl-2,3,3a,4,5,6,7,7a-octahydro-4,7-methanoindene,
5-propionoxy-5-butyl-2,3,3a,4,5,6,7,7a-octahydro-4,7 methanoindene,
5-isobutyroxy-5-hexyl-2,3,3a,4,5,6,7,7a-octahydro-4,7-methanoindene,
5-hexanoxy-5-octyl-2,3,3a,4,5,6,7,7aoctahydro-4,7-methanoindene, or
5-($\alpha$-methylpropionoxy)-5-ethyl-2,3,3a,4,5,6,7,7a-octahydro-4-7-methanoindene, and 3a,4,5,6,7,7a-hexahydro-4,7-methanoindene substituted in one of the 5 and 6 positions with acetoxy and ethyl, 3,4,5,-6,7,7a-hexahydro-4,7-methanoindene substituted in one of the 5 and 6 positions with acetoxy and propyl, 3a,4,5,6,-7,7a-hexahydro-4,7-methanoindene substituted in one of the 5 and 6 positions with propionoxy and isoamyl, 3a,4,-5,6,7,7a-hexahydro-4,7-methanoindene substituted in one of the 5 and 6 positions with butroxy and ethyl, 3a,4,5,-6,7,7a-hexahydro-4,7-methanoindene substituted in one of the 5 and 6 positions with butyroxy and butyl, or 3a,4,5,-6,7,7a-haxahydro-4,7-methanoindene substituted in one of the 5 and 6 positions with hexanoyloxy and propyl.

As hereinbefore indicated the highly pleasant odoriferous nature of the novel compounds of this invention render them highly valuable as perfume ingredients. The odor and odor characteristics of the different compounds embraced within this invention vary widely, however, and of the different compounds the most remarkable odors both from the standpoint of their pleasing nature and from their odor classification are possessed by the hexahydro-4,7-methanoindenes, and particularly 3a,4,5,6,7,7a-hexahydro-4,7-methanoindene substituted in one of the 5 and 6 positions with isoamyl and acetoxy. This particular compound has a pleasing, fresh note recalling the scarce and expensive cardamon seed oil. Moreover, this compound has an interesting and unique odor profile, for example, after about a one hour dryout on a perfume blotter, the initial cardamon seed oil odor fades to a pleasant, intense lasting odor recalling the oil of bergamont.

The compounds of this invention, either individually or in admixture, may be used in perfumery as the olfactory ingredients of perfumes and thus create novel perfume compositions. As used herein, the term perfume means a mixture of organic compounds including, for example, alcohols, aldehydes, ketones, esters, and frequently also hydrocarbons which are combined in fixed proportions so that the odors of the individual compounds combine to produce a harmonious fragrance. The quantity of the novel compounds of this invention utilized in perfumes may vary within a wide range and depends upon the particular compound used and the particular type of perfume prepared. For example, in the preparation of Muguet or Jasmine type perfumes using the isoamyl and acetoxy substituted methanoindenes as olfactory ingredients, the quantity used may range from about 0.1 to 30 percent of the total weight of the perfume with a quantity of about 5 to 15 percent by weight being preferred.

Perfume compositions of this invention having the disubstituted 4,7-methanoindenes of this invention as olfactory ingredients may be used as perfumes per se in alcoholic solution or incorporated into items such as cosmetic creams, soaps, synthetic detergents, talcum powders or other toilet goods such as shampoos to produce products having desirable commercial fragrance properties.

The following examples are given to illustrate the compounds of this invention, the preparational process therefor and perfumes containing the compounds as olfactory ingredients. These examples are not, however, intended to limit the generally broad scope of the present invention in strict accordance therewith.

Example I

The methanoindene ketones used to prepare the compounds of this invention are prepared as follows: (A) 3a,4,5,6,7,7a-hexahydro-4,7-methanoindene substituted in one of the 5 and 6 positions with an oxo substituent.

To a stirred reaction flask were added about 946 grams (7.17 mols) of 3a,4,7,7a-tetrahydro-4,7-methanoindene and 2800 grams of aqueous sulfuric acid (25% by weight $H_2SO_4$). The mixture was then heated to reflux (about 105° C.) for about 5.5 hours. The mixture was then cooled to about 25° C. and the product extracted with about 700 cubic centimeters of toluene. The toluene extract was washed to a neutral pH with an aqueous sodium chloride solution and then distilled to recover about 906 grams of the desired 3a,4,5,6,7,7a-hexahydro-4,7-methanoindene substituted in one of the 5 and 6 positions with hydroxy boiling at about 117° C. at 9 mm. Hg and having a refractive index of $1.5262_D^{20}$.

To a stirred reaction flask were charged 76 grams (0.74 mol) of concentrated sulfuric acid, about 425 milliliters of water and about 0.3 mol of sodium dichromate (117 grams of a 70 weight percent aqueous sodium dichromate solution). With the temperature maintained at about 40° to 50° C., about 68 grams (0.453 mols) of 3a,4,5,6,7,7a-hexahydro-4,7-methanoindene substituted in one of the 5 and 6 positions with hydroxy boiling about 78° C. at 0.5 mm. Hg to 84° C. at 0.8 mm. Hg and having a refractive index of 1.5262 to $1.5268_D^{20}$ were slowly added to the flask over a period of about 20 minutes. After the addition, the mixture was stirred for about one hour with the temperature varying from about 30° C. to 55° C. The product was extracted from the final mixture with about 200 milliliters hexane. The hexane extract was washed to neutral with aqueous sodium chloride solution, dried over calcium chloride and distilled to recover the desired ketone product boiling at about 71° C. at 1.0 mm. Hg and having a refractive index of $1.5174_D^{20}$. (B) 5-oxo-2,3,3a,4,5,6,7,7a-octahydro-4,7-methanoindene.

5-hydroxy-2,3,3a,4,5,6,7,7a-octahydro - 4,7 - methanoindene was prepared from the corresponding hydroxy substituted hexahydromethanoindene prepared in Part A above by charging about 369 grams of the hydroxy substituted hexahydromethanoindene to an autoclave and hydrogenating in the presence of about 40 grams of a reduced nickel catalyst at about 120° C. and 200 to 500 pounds per square inch hydrogen pressure. About 25 minutes was required for complete hydrogenation. The catalyst was removed by filtration and the hydrogenation product distilled to give about 353 grams of the desired product boiling about 100° C. at 2.0 mm. Hg and having a refractive index of $1.5136_D^{20}$.

The reaction was effected according to the procedure of Part (A) above using about 343 grams (2.26 mols) of 5-hydroxy-2,3,3a,4,5,6,7,7a-octahydro-4,7-methanoindene boiling about 95° C. to 100° C. at from 1.5 to 2.0 mm. Hg and having a refractive index of 1.5134 to $1.5138_D^{20}$, about 1.52 mols of sodium dichromate (580 grams of a 70 weight percent aqueous sodium dichromate solution), about 2150 grams of water and about 272 grams of concentrated sulfuric acid to give about 272 grams of the desired ketone boiling at 70° C. at 1.0 mm. Hg, and having a refractive index of $1.5025_D^{20}$.

Example II 3a,4,5,6,7,7a-hexahydro-4,7-methanoindene substituted in one of the 5 and 6 positions with isoamyl and acetoxy was prepared according to the process of this invention by the following procedure:

To a stirred reaction flask equipped with heating and cooling means and with an overhead condenser and means for maintaining an atmosphere of nitrogen therein was charged a portion of a solution of 68 grams (0.45 mol) of isoamyl bromide and about 106 grams of anhydrous diethyl ether sufficient to completely cover about 11.3 grams (0.47 mol) of magnesium metal turnings contained in the flask. After stirring for a few minutes, an exothermic reaction started which raised the temperature of the mixture to reflux temperature (37° C.) at which point about 106 grams of anhydrous diethyl ether were added to the flask. The remaining portion of the solution of isoamyl bromide and diethyl ether was then slowly added to the flask at a rate adjusted to maintain refluxing temperature with the addition being completed in about 50 minutes. The refluxing of the mixture was then continued by external heating for about another hour. A solution of about 61 grams (0.41 mol) of 3a,4,5,6,7,7a-hexahydro-4,7-methanoindene substituted in one of the 5 and 6 positions with an oxo group and about 106 grams of diethyl ether was then added with the mixture being cooled to about 25° C. in about 15 minutes. After about 10 minutes, about 51 grams (0.5 mol) of acetic anhydride were added to the mixture over a period of about 5 minutes while maintaining the temperature of the mixture at about 25° C. The resulting mixture was thereafter stirred for about one hour while maintaining such temperature after which the temperature was raised to reflux (about 37° C.) and maintained thereat for about one hour. Ice water was added and the resulting mixture washed with water and a saturated sodium carbonate solution. The solvent was then distilled and the residue thereafter subjected to vacuum fractionation to recover the product distilling at from 95° C. at 0.5 mm. Hg to 111° C. at 1 mm. Hg and having a refractive index of $n_D^{20}$ 1.4847 to 1.4854.

Example III 5-isoamyl - 5 - acetoxy - 2,3,3a,4,5,6,7,7a-octahydro-4,7-methanoindene is prepared according to the process of this invention by the following procedure:

To a stirred reaction flask equipped with heating and cooling means and with an overhead condenser and means for maintaining an atmosphere of nitrogen therein is charged a portion of a solution of 75.5 grams (0.5 mol) of isoamyl bromide and about 115 grams of anhydrous diethyl ether sufficient to completely cover about 13.2 grams (0.55 mol) of magnesium metal turnings contained in the flask. After stirring for a few minutes, an exothermic reaction starts which raises the temperature of the mixture to reflux temperature (37° C.) at which point about 115 grams of anhydrous diethyl ether are added. The remaining portion of the solution of isoamyl bromide and diethyl ether is then slowly added to the flask at a rate adjusted to maintain refluxing temperature with the addition being completed in about an hour. The refluxing of the mixture is then continued by external heating for about another hour. A solution of about 67.5 grams (0.45 mol) of 5-oxo-2,3,3a,4,5,6,7,7a-octahydro-4,7-methanoindene and 115 grams of diethyl ether is then added and the mixture cooled to about 25° C. After a few minutes, about 56.2 grams (0.55 mol) of acetic anhydride are added to the mixture over a short period while maintaining the temperature of the mixture at about 25° C. The resulting mixture is thereafter stirred for about one hour while maintaining such temperature. Then the temperature is raised to reflux about 37° C.) and maintained thereat for about one hour. Ice water is then added and the resulting mixture washed with water and a saturated sodium carbonate solution. The solvent is then distilled and the residue thereafter subjected to vacuum fractionation to recover the product.

Example IV 3a,4,5,6,7,7a - hexahydro-4,7-methanoindene substituted in one of the 5 and 6 positions with isopropyl and propionoxy, is prepared according to the process of this invention by the following procedure:

To a stirred reaction flask equipped with heating and cooling means and with an overhead condenser and means for maintaining an atmosphere of nitrogen therein is charged a portion of a solution of 33.2 grams (0.27 mol) of isopropyl bromide and about 90 grams of anhydrous diethyl ether sufficient to completely submerge about 6.6 grams (0.27 mol) of magnesium metal turnings contained in the flask. After stirring for a few minutes, an exothermic reaction starts which raises the temperature of the mixture to reflux temperature (37° C.) at which point about 90 grams of anhydrous diethyl ether are added. The remaining portion of the solution of isopropyl bromide and diethyl ether is then slowly added to the flask at a rate adjusted to maintain refluxing temperature with the addition being completed in about an hour. The refluxing of the mixture is then continued by external heating for about another hour. A solution of 37 grams (0.25 mol) of 3a,4,5,6,7,7a-hexahydro-4,7-methanoindene substituted in one of the 5 and 6 positions with an oxo group and about 90 grams of diethyl ether is then added and the mixture cooled to about 25° C. After a few minutes, about 39 grams (0.3 mol) of propionic anhydride are added to the mixture over a short period while maintaining the temperature of the mixture at about 25° C. The resulting mixture is thereafter stirred for about one hour while maintaining such temperature. Then the temperature is saired to reflux (about 37° C.) and maintained thereat for about one hour. Ice water is then added and the resulting mixture washed with water and a saturated sodium carbonate solution. The solvent is then distilled and the residue thereafter subjected to vacuum fractionation to recover the product.

Example V 5-secbutyl - 5 - acetoxy - 2,3,3a,4,5,6,7,7a-octahydro-4,7-methanoindene is prepared according to the process of this invention by the following procedure:

To a stirred reaction flask equipped with heating and cooling means and with an overhead condenser and means for maintaining an atmosphere of nitrogen therein is charged a portion of a solution of 137 grams (1.0 mol) of secbutyl bromide and about 200 grams of anhydrous diethyl ether sufficient to completely cover about 24.3 grams (1.0 mol) of magnesium metal turnings contained in the flask. After stirring for a few minutes, an exothermic reaction starts which raises the temperature of the mixture to reflux temperature (37° C.) at which point about 200 grams of anhydrous diethyl ether are added. The remaining portion of the solution of secbutyl bromide and diethyl ether is then slowly added to the flask at a rate adjusted to maintain refluxing temperature with the addition being completed in about an hour. The refluxing of the mixture is then continued by external heating for about another hour. A solution of about 135 grams (0.9 mol) of 5-oxo-2,3,3a,4,5,6,7,7a-octahydro-4,7-methanoindene and 200 grams of diethyl ether is then added and the mixture cooled to about 25° C. After a few minutes, about 112 grams (1.1 mol) of acetic anhydride are added to the mixture over a short period while maintaining the temperature of the mixture at about 25° C. The resulting mixture is thereafter stirred for about one hour while maintaining such temperature. Then the temperature is raised to reflux (about 37° C.) and maintained thereat for about one hour. Ice water is then added and the resulting mixture washed with water and a saturated sodium carbonate solution. The solvent is then distilled and the residue thereafter subjected to vacuum fractionation to recover the product.

Example VI

5 - ethyl - 5 - acetoxy - 2,3,3a,4,5,6,7,7a-octahydro-4,7-methanoindene is prepared according to the process of this invention by the following procedure:

To a stirred reaction flask equipped with heating and cooling means and with an overhead condenser and means for maintaining an atmosphere of nitrogen therein is charged a portion of a solution of 239.7 grams (2.2 mol) of ethyl bromide and about 300 grams of anhydrous diethyl ether sufficient to completely cover about 53.5 grams (2.2 mol) of magnesium metal turnings contained in the flask. After stirring for a few minutes, an exothermic reaction starts which raises the temperature of the mixture to reflux temperature (37° C.) at which point about 300 grams of anhydrous diethyl ether are added. The remaining portion of the solution of ethyl bromide and diethyl ether is then slowly added to the flask at a rate adjusted to maintain refluxing temperature with the addition being completed in about an hour. The refluxing of the mixture is then continued by external heating for about another hour. A solution of 300 grams (2.0 mol) of 5-oxo-2,3,3a,4,5,6,7,7a-octahydro-4,7-methanoindene and about 300 grams of diethyl ether is then added and the mixture cooled to about 25° C. After a few minutes, about 224 grams (2.2 mol) of acetic anhydride are added to the mixture over a short period while maintaining the temperature of the mixture at about 25° C. The resulting mixture is thereafter stirred for about one hour while maintaining such temperature. Then the temperature is raised to reflux (about 37° C.) and maintained thereat for about one hour. Ice water is then added and the resulting mixture washed with water and a saturated sodium carbonate solution. The mixture is then distilled and the residue thereafter subjected to vacuum fractionation to recover the product distilling from 93° to 94° C. at 1 mm. Hg and having a refractive index of $n_D^{25}$ 1.4828.

Example VII 3a,4,5,6,7,7a - hexahydro-4,7-methanoindene substituted in one of the 5 and 6 positions with isoamyl and hydroxy is prepared according to the process of this invention by the following procedure:

To a stirred reaction flask equipped with heating and cooling means and with an overhead condenser and means for maintaining an atmosphere of nitrogen therein is charged a portion of a solution of 68 grams (0.45 mol) of isoamyl bromide and about 106 grams of anhydrous diethyl ether sufficient to completely cover about 11.3 grams (0.47 mol) of magnesium metal turnings contained in the flask. After stirring for a few minutes, an exothermic reaction starts which raises the temperature of the mixture to reflux temperature (37° C.) at which point about 106 grams of anhydrous diethyl ether are added to the flask. The remaining portion of the solution of isoamyl bromide and diethyl ether are then slowly added to the flask at a rate adjusted to maintain refluxing temperature with the addition being completed in about an hour. The refluxing of the mixture is then continued by external heating for about another hour. A solution of about 61 grams (0.41 mol) of 3a,4,5,6,7,7a-hexhydro-4,7-methanoindene substituted in one of the 5 and 6 positions with an oxo group and about 106 grams of diethyl ether are then added with the mixture being cooled to about 25° C. Then about 800 milliliters of a saturated aqueous ammonium chloride solution are added and the resulting aqueous layer is separated from the organic layer. The aqueous layer is extracted with toluene and the extract added to the organic layer. The combined organic mixture is washed with a 10 percent aqueous hydrochloric acid solution followed by a 5 percent sodium bicarbonate solution and then with salt water until the organic mixture is neutral to litmus. The organic mixture is then distilled to recover the product.

Example VIII

A perfume of the following composition having a Jasmine character was made using a compound of this invention as an olfactory ingredient:

| Component: | Parts by weight |
|---|---|
| 3a,4,5,6,7,7a - hexahydro - 4,7 - methanoindene substituted in one of the 5 and 6 positions with isoamyl and acetoxy | 4 |
| Benzyl acetate | 40 |
| Dimethylbenzylcarbinyl acetate | 8 |
| Hydroxy citronellol | 2 |
| Phenylethyl alcohol | 1 |
| Diphenylmethane | 1 |
| Tepyl acetate | 3 |
| Ionone alpha | 2 |
| Diethyl phthalate | 10 |
| Linalool | 3 |
| | 74 |

Example IX

A perfume of the following composition having a Muguet character was made using a compound of this invention as an olfactory ingredient:

| Component: | Parts by weight |
|---|---|
| 3a,4,5,6,7,7a - hexahydro - 4,7 - methanoindene substituted in one of the 5 and 6 positions with isoamyl and acetoxy | 6 |
| Diphenylmethane | 40 |
| Tetrahydrolinalool | 25 |
| Phenylacetaldehyde dimethylacetal | 5 |
| Allyl phenylpropionate | 1 |
| Methylacetophenone | ½ |
| Tepyl acetate | ½ |
| Ionone standard | 2 |
| Heptyl formate | 1 |
| Amyl phenylacetate | 5 |
| Methylcinnamic aldehyde | ½ |
| Rose crystals | ½ |
| Isobornyl formate | ½ |
| Oil bois de rose | 5 |
| | 92½ |

I claim as my invention:
1. A compound selected from the group consisting of 3a,4,5,6,7,7a-hexahydro-4,7-methanoindene and 2,3,3a,4,5,6,7,7a-octahydro-4,7-methanoindene which is substituted in one of the 5 and 6 positions with both a radical of the formula:

X—O and with a radical of the formula:

Z— wherein X is a member selected from the group consisting of hydrogen and an acyl group derived from a lower alkanoic acid having 1 to 7 carbon atoms group, O is oxygen and Z is an alkyl group having 1–8 carbon atoms.

2. The compound according to claim 1 wherein the X of the X—O radical is an acyl group derived from an alkanoic acid having from 1 to about 7 carbon atoms and the Z radical is an alkyl group having from 1 to about 8 carbon atoms.

3. The compound according to claim 1 wherein the X of the X—O radical is acetyl and the Z radical is ethyl.

4. The compound according to claim 1 wherein the X of the X—O radical is acetyl and the Z radical is isoamyl.

5. The compound according to claim 1 wherein 3a,4,5, 6,7,7a-hexahydro-4,7-methanoindene is substituted in one of the 5 and 6 positions both with acetoxy and isoamyl.

References Cited
UNITED STATES PATENTS 3,238,251    3/1966    Williams _____ 260—617

LORRAINE A. WEINBERGER, *Primary Examiner.*

V. GARNER, *Assistant Examiner.*

U.S. Cl. X.R.

167—94; 260—617